(12) United States Patent
Williams

(10) Patent No.: US 10,286,566 B2
(45) Date of Patent: May 14, 2019

(54) MANIPULATOR END EFFECTOR

(71) Applicant: Oceaneering International, Inc., Houston, TX (US)

(72) Inventor: Lance Michael Williams, Morgan City, LA (US)

(73) Assignee: Oceaneering International, Inc., Houston, TX (US)

( * ) Notice: Subject to any disclaimer, the term of this patent is extended or adjusted under 35 U.S.C. 154(b) by 425 days.

(21) Appl. No.: 15/287,051

(22) Filed: Oct. 6, 2016

(65) Prior Publication Data

US 2017/0095937 A1    Apr. 6, 2017

Related U.S. Application Data

(60) Provisional application No. 62/238,027, filed on Oct. 6, 2015.

(51) Int. Cl.
| B25J 15/04 | (2006.01) |
| B25J 19/00 | (2006.01) |
| B25J 15/00 | (2006.01) |
| B63B 35/00 | (2006.01) |
| B63C 11/52 | (2006.01) |

(52) U.S. Cl.
CPC ....... *B25J 19/0066* (2013.01); *B25J 15/0028* (2013.01); *B25J 15/0408* (2013.01); *B25J 19/0033* (2013.01); *B25J 15/0483* (2013.01); *B63B 35/00* (2013.01); *B63B 2035/008* (2013.01); *B63C 11/52* (2013.01)

(58) Field of Classification Search
CPC ... B63C 11/52; B25J 15/0408; B25J 15/0483; B25J 15/04

USPC .................................................. 114/312, 313
See application file for complete search history.

(56) References Cited

U.S. PATENT DOCUMENTS

| 4,620,362 A | * | 11/1986 | Reynolds ................. B25J 15/04 279/900 |
| 10,047,908 B1 | * | 8/2018 | Bohle, II ................... F16P 3/02 |
| 2006/0088367 A1 | * | 4/2006 | Dellach .................... B25J 15/04 403/31 |
| 2009/0233774 A1 | * | 9/2009 | McCoy, Jr. ............ B23Q 3/155 483/1 |

(Continued)

FOREIGN PATENT DOCUMENTS

WO    WO2007/045914    *    4/2007    .............. B25J 15/04

OTHER PUBLICATIONS

"Reliabilitiy, Safety, and Strength Realized in ATI's New Patent", 2016, ATI. https://web.archive.org/web/20141015011339/http://www.ati-ia.com/Company/NewsArticle.aspx?id=700132592&campaign-patent (Year: 2016).*

(Continued)

*Primary Examiner* — William Kelleher
*Assistant Examiner* — Gregory T Prather
(74) *Attorney, Agent, or Firm* — Maze IP Law, P.C.

(57) ABSTRACT

In embodiments, a subsea manipulator tool changer comprises an ROV attachable standardized tool receiver and a tool, the subsea manipulator tool changer comprising a standardized tool latch and a standardized tool latch receiver whereby tools can be attached and detached subsea. In other embodiments, a system for changing tools while subsea comprises an ROV, a subsea manipulator tool changer, and a tool caddy configured to accept and release a tool where the tool comprises the standardized tool latch receiver.

13 Claims, 14 Drawing Sheets

(56) References Cited

U.S. PATENT DOCUMENTS

| | | | | |
|---|---|---|---|---|
| 2012/0087723 A1* | 4/2012 | Shafer | ............... | B25J 15/04 |
| | | | | 403/361 |
| 2016/0016269 A1* | 1/2016 | Maffeis | ............ | B23Q 3/15553 |
| | | | | 483/65 |
| 2017/0053767 A1* | 2/2017 | Scott | ............... | H01H 85/003 |
| 2017/0093082 A1* | 3/2017 | Jones | ............... | H01R 13/4538 |
| 2018/0306979 A1* | 10/2018 | Armistead | ......... | G02B 6/3816 |

OTHER PUBLICATIONS

Outgoing Written opinion of the ISA for related PCT/US2016/055695. May 1, 2017 (Year: 2017).*

* cited by examiner

_US 10,286,566 B2_

MANIPULATOR END EFFECTOR

RELATIONSHIP TO PRIOR APPLICATIONS

This application claims benefit through U.S. Patent Provisional Application 62/238,027 filed on Oct. 6, 2015 and titled "Electro-hydraulic Subsea Manipulator Tool Changer."

BACKGROUND

Remotely operated vehicles (ROV) often need to use one or more tools subsea. At times, several such tools may be required and it is desirable to swap such tools subsea. The action of swapping tools subsea can be performed via human control topside or automatically with visual recognition software. However, lack of standard interfaces hampers the ability to swap tools subsea.

In addition, swappable tools would require the ability to provide fluid and/or electrical power and/or data cabling between the ROV and tool. It is desirable to have such connections using zero leak hydraulic connections and/or wet-mateable electrical connectors.

FIGURES

Various figures are included herein which illustrate aspects of embodiments of the disclosed inventions.

DESCRIPTION OF EMBODIMENTS

Figure 1:
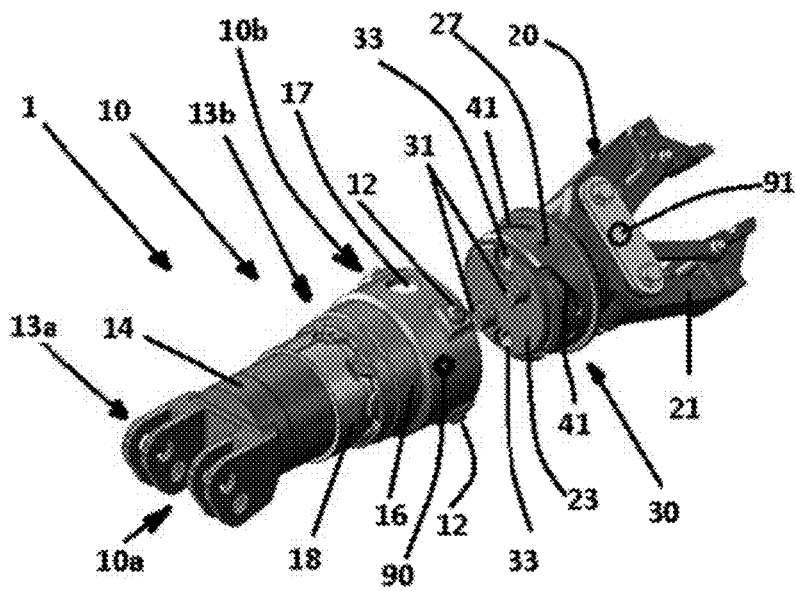
FIG. 1 is a view in partial perspective of an exemplary embodiment of a manipulator tool changer.
Figure 11:
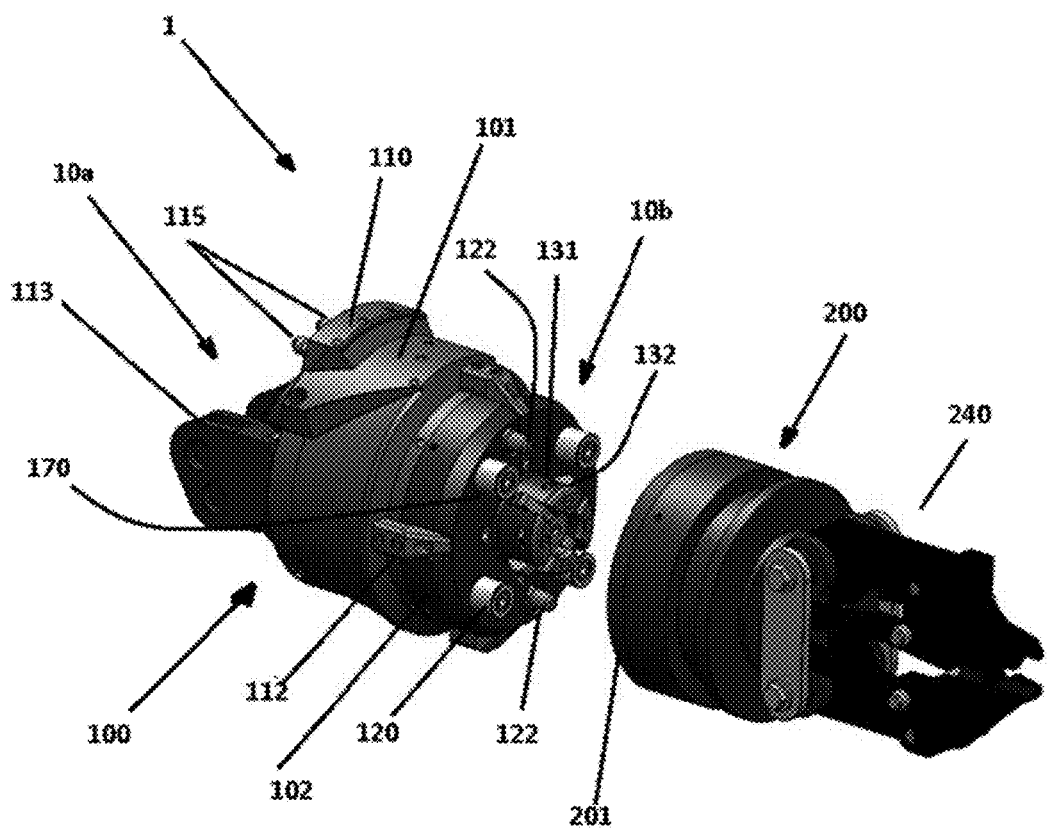
FIGS. 11 and 12 are views in partial perspective of a further exemplary embodiment of a manipulator tool changer.
Figure 12:
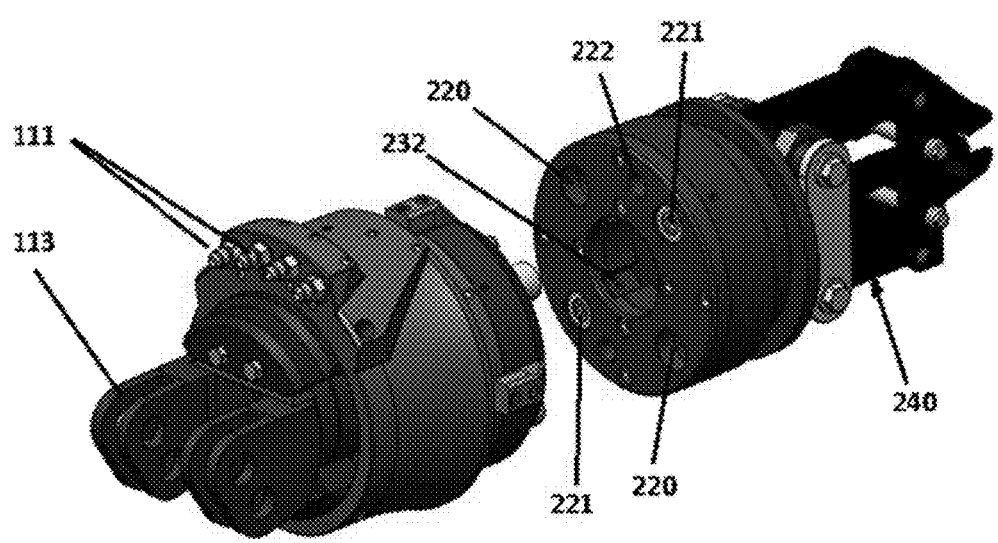

Referring generally to FIGS. 1 and 11, manipulator tool changer 1 generally comprises ROV attachable standardized tool receiver 10,100 and tool 20,200, each comprising cooperative standardized latches as described generally herein below. It is understood that FIGS. 1 and 11 are illustrations of two separate embodiments of manipulator tool changer 1 which, as they are similar, are generally discussed together in the description below.

As used herein, a "tool" can include subsea tools such as, by way of example and not limitation, grinders, cleaners, and the like. By way of further example, in FIG. 1 tool 20 is illustrated as comprising end effector 21.

In all embodiments, tool identifier interrogator 90 and complimentary tool identifier 91 may be present. Typically, tool identifier interrogator 90 comprises a radio frequency identifier (RFID) interrogator disposed proximate a predetermined portion of arm 10 and tool identifier comprises a complimentary radio frequency identifier 91 disposed proximate tool 20.

Figure 2:
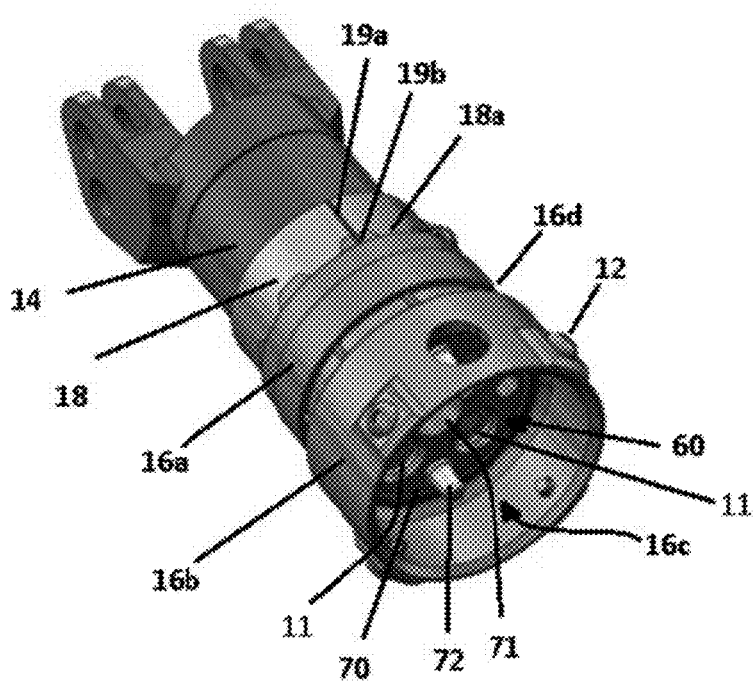
FIG. 2 is a view in partial perspective of an exemplary ROV attachable standardized tool receiver.

Referring additionally to FIGS. 2 and 11, ROV attachable standardized tool receiver 10,100 comprises first arm section 14,101, second arm section 16,102 disposed proximate second end 10*b* of first arm section 14,101, and one or more tool insertion guides 72,112 disposed proximate second end 10*b*. In certain embodiments tool insertion guides 72 may be received at least partially through collar ring 51 such as ports 52. Collar ring 51 may be secured to bearing outer surface 50 using fasteners 53.

First arm section 14,101 comprises inner annulus 71,105; a predetermined set of tool controller pathways 111 disposed at least partially within first arm section 14,101; selectively attachable end 13*a*,113 disposed proximate first end 10*a*,110 of first arm section 14,101; tool interface 70, 140 movably disposed within inner annulus 71,105; actuator 60, 141 operatively in communication with tool interface 70, 140; and second end 10*b*.

In embodiments, tool interface 70,140 comprises a piston such as piston 140 (FIG. 13) and may further comprise one or more seals 135 (FIG. 13) disposed about an outer surface of piston 140.

The predetermined set of tool controller pathways 111 may comprise a hydraulic fluid pathway, a data and/or power electrical current pathway, a fiber optic pathway, or the like, or a combination thereof. A corresponding set of fittings 115, typically one fitting 115 for each tool controller pathway 111, may be present such as at first end 110 to aid in terminating hydraulic supply lines for hydraulic tool controller pathways 111 to allow supplying hydraulic fluid to tool 20.

Second arm section 16,102 is disposed proximate second end 10*b* of first arm section 14 and may comprise one or more piston ports 137 adapted to receive a portion of piston 140 (FIG. 13) therethrough; standardized tool latch 12,130 operatively in communication with piston 140; and a first predetermined set of wet-matable tool actuator connectors 11,120 operatively in communication with the predetermined set of tool controller pathways 111 where tool actuator connectors 11,120 are configured for use subsea and may comprise quick disconnect, wet-mateable, and/or zero-drip connectors which can operate independently or be joined at a controller to increase flow for high demand tools. Wet-mateable connectors are typically used for electrical pass-thru.

Tool insertion guide 72, 112 may be present to provide for rough and/or fine alignment of tool receiver 16a and tool 20.

Tool insertion guide receivers 33,222 may be machined into tool core 23,223. Each tool insertion guide 72, 112 and tool insertion guide receiver 33,222 may further comprise a complimentarily tapered tool insertion guide 71,112 and tool insertion guide receiver pair 33,222.

Tool 20,200 is configured to mate cooperatively with tool receiver 10,100 and generally comprises a selectively replaceable ROV manipulatable tool 21,240 which is typically operatively in communication with a predetermined subset of wet-matable tool actuator connector engagers 31,221 of the first predetermined set of wet-matable tool actuator connector engagers 31,221 and may comprise an end effector or the like. In most situations, at least one wet-matable tool actuator connector engager 31,221 is operative, although not all embodiments require all or even any of the predetermined subset of wet-matable tool actuator connector engagers 31,221 to be operative. Tool locking plate 250 may be attached to an end of tool 20 to help provide a rigid connection between tool 20 and second arm section 16,102.

Referring back to FIG. 1, in an embodiment manipulator tool changer 1 comprises an electro-hydraulic subsea manipulator tool system, comprising arm 10 and tool 20. In these embodiments, arm 10 comprises first arm section 14 comprising selectively attachable end 13a and tool changer attachable end 13b disposed opposite selectively attachable end 13a; clamp collar 18 disposed an outer surface of the first arm section 14; second arm section 16 comprising locking collar 16 disposed intermediate clamp collar 18 and tool changer attachable end 13b; and connector body 65 disposed at least partially within inner annulus 16c (FIG. 2) of tool receiver 16. One or more ports 17 may be present through an outer surface of tool receiver 16b and extend into inner annulus 16c of tool receiver 16b.

Referring additionally to FIG. 2, locking collar 16 typically comprises collar engager 16a and tool receiver 16b and clamp collar 18 typically comprises locking collar engaging end 18a disposed about arm 10 towards tool changer attachable end 13b. Collar engager 16a is typically slidingly disposed about an outer surface of arm 10 and configured to securely but releasably engage locking collar engaging end 18a of engaging collar 18. Locking collar engaging end 18a and collar engager receiving edge 16d typically comprise complimentary locking edges such as crenelated edges.

Locking collar 16 typically comprises inner annulus 16c.

Tool receiver 16b is typically configured to allow collar engager 16a to travel axially about the outer surface of arm 10. Tool receiver 16b typically comprises one or more pins 12 disposed at least partially into inner annulus 16c; collar engager receiving edge 16d; and connector body 65 disposed at least partially within inner annulus 16c of locking collar 16.

Connector body 65 typically comprises tool interface 70 comprising an inner conduit 71, where connector body 65 is configured to move within inner annulus 16c of tool receiver 16b; locking actuator 60 (FIG. 3) connected to tool interface 70 at a first portion of tool interface 70; one or more spacers 61 (FIG. 3) comprising external and/or internal threads, and bearing outer surface 50 configured to actuate locking collar 16 while slipping through static interface plate 73 powered by an actuator, which can comprise an atlas motor. Shelf 54 may be present within connector body 65 and configured to limit travel of tool interface 70 within connector body 65. One or more guide pins 72 projects outwardly from a second portion of tool interface 70. A predetermined set of quick disconnect connectors 11 are typically disposed within a predetermined portion of tool interface 70, where each quick disconnect connector 11 may be operatively engageable with a complimentary quick disconnect connector engager 33 (FIG. 1).

Typically, inner conduit 71 is configured to accept one or more controls and/or cables there-through such as Ethernet or other data cabling or the like.

One or more selectively engageable pivoting arms 78 (FIG. 3) are also typically present and disposed through a predetermined portion of an outer surface of tool interface 70.

Referring back to FIG. 1, in this embodiment tool 20 typically comprises tool insertion end 30, comprising an outer circumferential surface dimensioned to fit within inner annulus 16c (FIG. 2) of tool receiver 16b; one or more J-lock channels 41 disposed about and partially into the outer circumferential surface of tool insertion end 30, where each J-lock channel 41 is configured to selectively engage a corresponding pin 12 (FIG. 2); none to one or more quick disconnect engagers 33 configured to complimentarily engage with and disengage from a predetermined corresponding quick disconnect connector 11 (FIG. 2); and one or more guide pin receivers 31 configured to releasably mate with a matching corresponding guide pin 72 (FIG. 2). In certain contemplated embodiments, J-lock channel 41 and its corresponding pin 12 comprise an electromagnetic lock.

Figure 3:
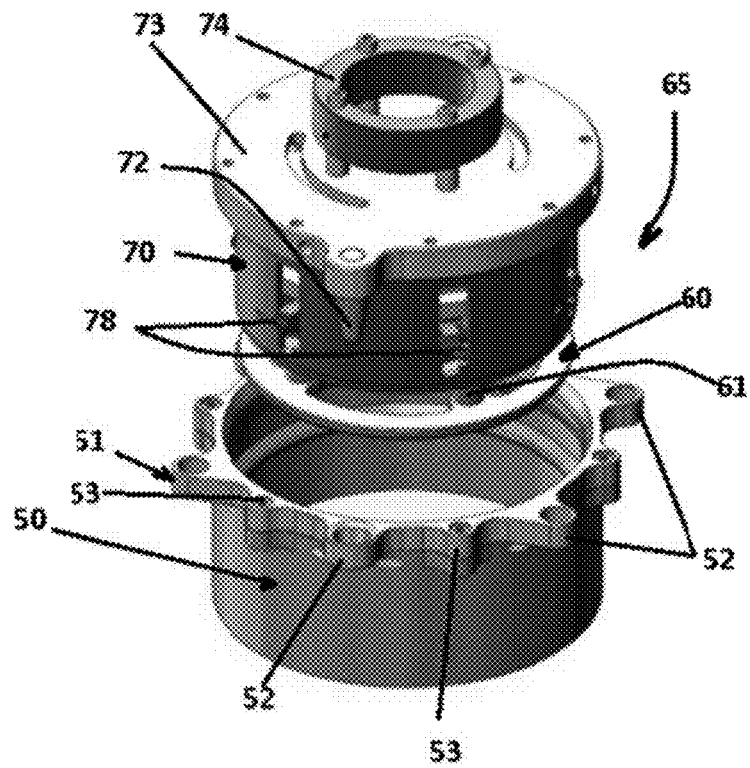
FIG. 3 is an exploded view in partial perspective of components of an exemplary ROV attachable standardized tool receiver.
Figure 4:
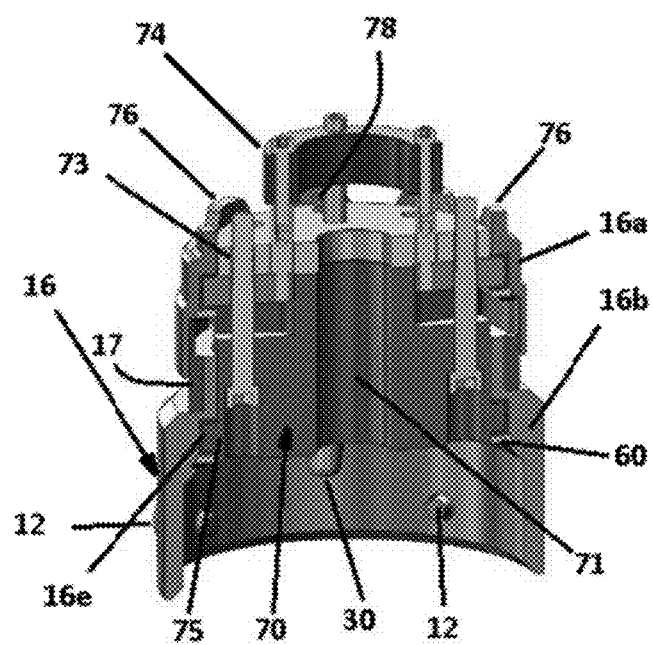
FIG. 4 is a cutaway view in partial perspective of components of an exemplary ROV attachable standardized tool receiver.
Figure 5:
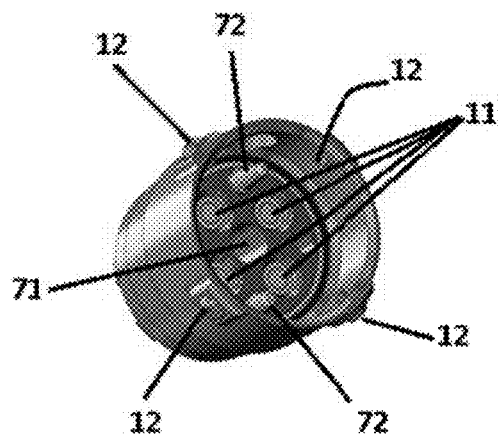
FIG. 5 is a view in partial perspective of an exemplary ROV attachable standardized tool receiver.
Figure 6:
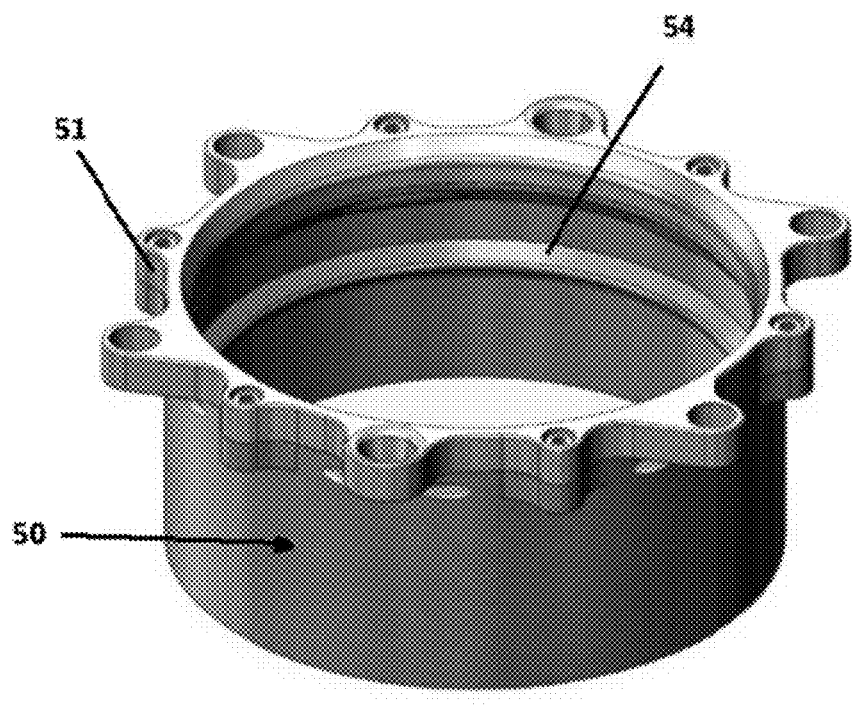
FIG. 6 is a view in partial perspective of an exemplary ROV attachable standardized tool receiver.
Figure 7:
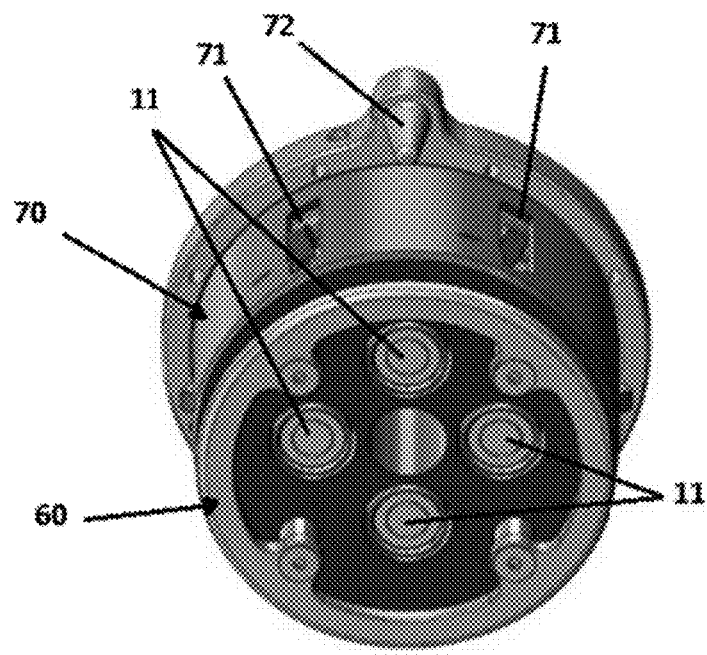
FIG. 7 is a view in partial perspective of an exemplary ROV attachable standardized tool receiver.
Figure 8:
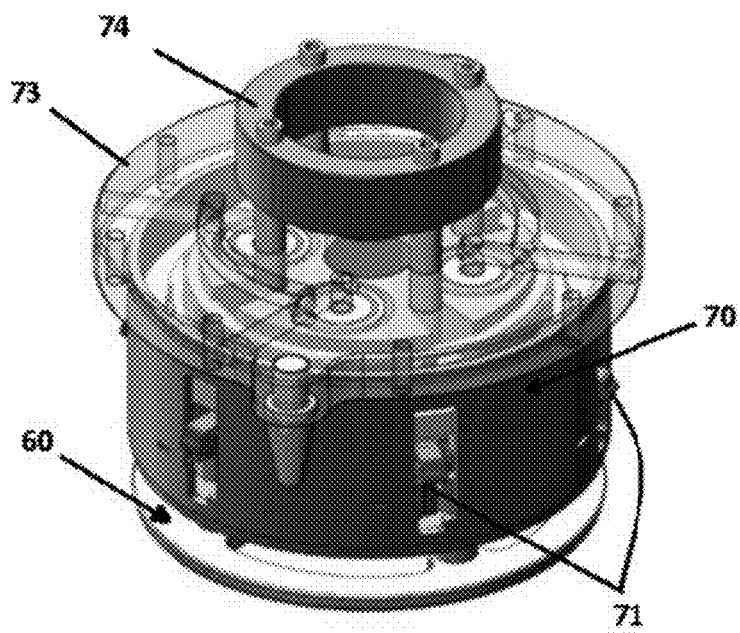
FIG. 8 is a semi-transparent view in partial perspective of an exemplary ROV attachable standardized tool receiver.
Figure 9:
FIGS. 9 and 10 are semi-transparent views in partial perspective of a manipulator tool changer with a tool received into an exemplary ROV attachable standardized tool receiver.
Figure 10:
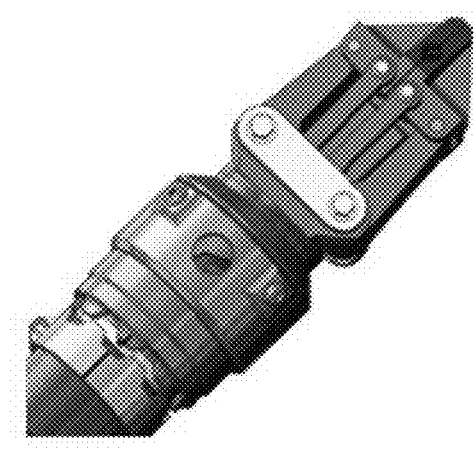

Referring additionally to FIGS. 3 and 4, in certain of these embodiments, tool interface 70 comprises outer protruding ring 75 and tool receiver 16b further comprises one or more channels 16e adapted to receive outer protruding ring 75.

In certain of these embodiments, connector body 65 further comprises travel boot 74 disposed proximate the first portion of connector body 65 and one or more springs 78 disposed intermediate travel boot 74 and the first portion of connector body 65.

In most embodiments, tool insertion end 30 comprises standardized tool latch receiver 41,230 configured to selectively and releasably receive standardized tool latch 12,130; one or more tool insertion guide receivers 33,222 configured to selectively and releasably receive tool insertion guide 72,122; and a first predetermined set of wet-matable tool actuator connector engagers 31,221 configured to cooperatively mate with a predetermined subset of matching wet-matable tool actuator connectors 11 of the first predetermined set of wet-matable tool actuator connectors 11.

As with all embodiments, wet-matable tool actuator connectors 11,120 and wet-matable tool actuator connector engagers 31,221 may comprise quick disconnect connector pairs such as hydraulic quick disconnect connectors, electrical quick disconnect connectors including pinless wet-mate electrical connectors, fiber optic quick disconnect connectors, or the like, or a combination thereof. It is understood that electrical quick disconnect connectors can provide power, data, or the like. It is also understood that in various embodiments each of the tool actuator connector engagers 31,221 and tool actuator connectors are complimentary sections of an overall quick disconnect connector pair and may comprise pressure balanced coupling pairs.

ROV manipulatable tool 21,240 is operatively in communication with a predetermined subset of wet-matable tool actuator connector engagers 31,221 of the first predetermined set of wet-matable tool actuator connector engagers 31,221.

Tool insertion guide 112 and tool insertion guide receiver 301 (FIG. 15) are typically configured such that when mated the first predetermined set of wet-matable tool actuator connector engagers 31,221 cooperatively mate with a predetermined matching wet-matable tool actuator connector 11,120 of the first predetermined set of wet-matable tool actuator connectors 11,120.

Referring back to FIGS. 1 and 2, in embodiments standardized tool latch 12,130 and standardized tool latch receiver 41 comprise a cam-lock and one or more sight ports 17 may be present and disposed through a portion of tool receiver 16b. Further, in these embodiments clamp collar 18, which typically comprises locking collar engaging end 18a, is disposed intermediate proximate first end 10a of arm 10 and tool receiver 16b. In these embodiments, second arm section 16 further comprises locking collar 16 which comprises collar engager 16a and tool receiver sleeve 16b. Collar engager 16a is typically slidingly disposed about an outer surface of arm 10 and is configured to securely engage locking collar engaging end 18a of engaging collar 18. Tool receiver 16b is typically disposed proximate second end 10b and typically configured to allow collar engager 16a to travel axially about the outer surface of arm 10 intermediate tool receiver 16b and first end 10a. Collar engager 16a and clamp collar 18 may further comprise a set of complimentary alignment aids 19a,19b (FIG. 2) such as visible marks. Further, collar engager 16a and clamp collar 18 may further comprise complimentary crenelated edges.

In this embodiment, the predetermined set of tool receiver guide pin receivers may comprise one or more J-lock channels 41 configured to securely accept pins 12 (FIG. 2).

Figure 13:
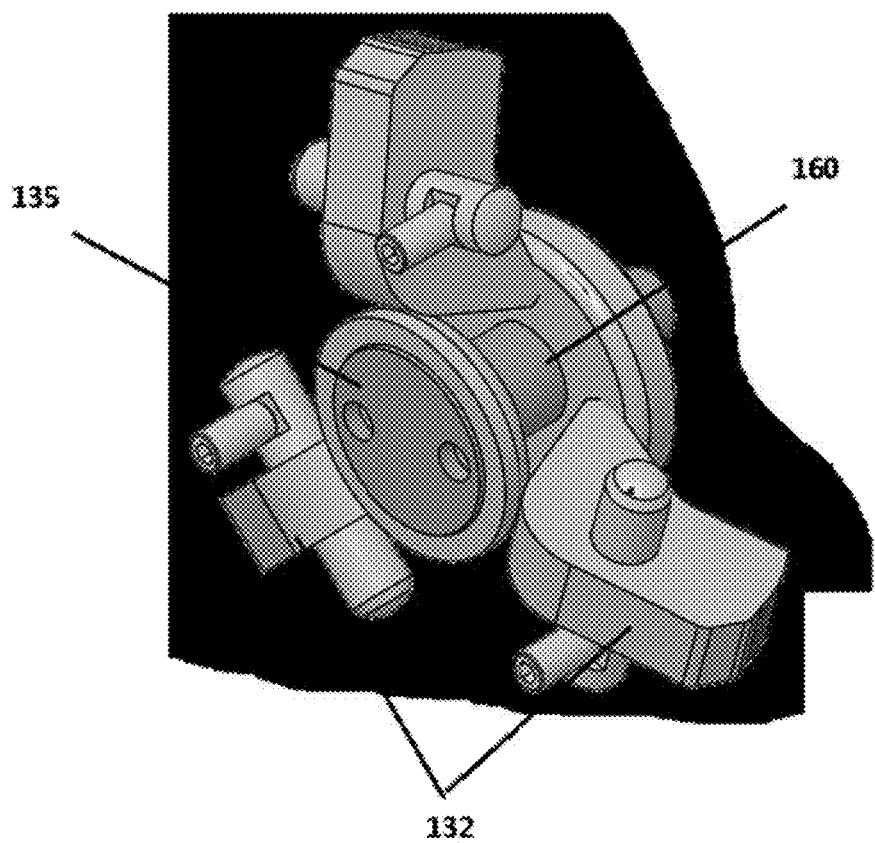
FIG. 13 is a view in partial perspective of a detail of a latch.
Figure 14:
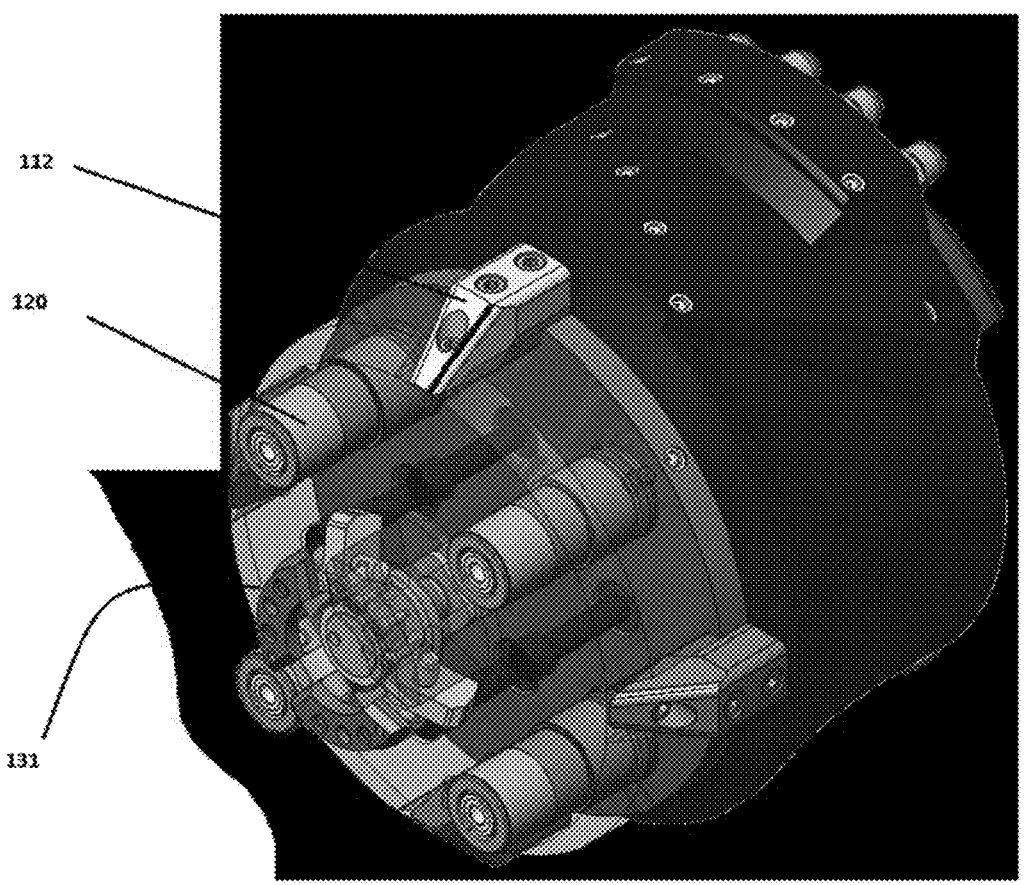
FIG. 14 is a semi-transparent view in partial perspective of an exemplary ROV attachable standardized tool receiver.

Referring now to FIGS. 13 and 14, in a further configuration actuator 141 comprises a hydraulic piston actuator, a solenoid, an electric motor, or the like, or a combination thereof.

Standardized tool latch 130 typically comprises one or more selectively engagable arms 132 and standardized tool latch receiver 230 may comprise one or more corresponding channels 232, each channel 232 configured to receive a selectively engagable arm 132. Arm travel limiter 134 is also typically present and operatively in communication with piston 140 and the plurality of pivotable arms 132 such as via latch post 160. Typically, selectively engagable arms 132 are typically pivotally connected to arm travel limiter 134 and configured to selectively engage a predetermined portion of standardized tool latch receiver 230 when fully inserted into standardized tool latch receiver 230.

Arm base 133 is typically present and operatively in communication with piston 140 and the plurality of pivotable arms 132 such as via latch post 160. Arm base 133 may further comprise one or more floating washers 135 (FIG. 13) configured to maintain contact at all times with each selectively engagable arm 132.

In this embodiment, second arm section 100 may further comprise rotary bore 151 comprising one or more seals 152; rotary joint bore shaft 153; sleeve bearing 154 which is typically hollow; and actuator 141 (FIG. 14) which comprises a motor such as a rotary motor operatively in communication with piston 140. Seals 152 may be rotary seals. Sleeve bearing 154 provides a bearing surface for rotary joint bore shaft 153 to allow rotary joint bore shaft 153 to rotate independently of rotary bore 151.

Actuator 141 may be a hydraulic motor, an electrical motor, a solenoid, or the like. Rotary bore 151 may be a rigid hydraulic motor casing and sleeve bearing 154 may rotate within rotary bore 151 where wrist rotation provides rotation to manipulator tool changer 1. In alternative embodiments, actuator 141 may be an electric motor which may further provide for electrical pass-through for electrical tool operation, communication, feature recognition, and the like, or a combination thereof. Rotation of actuator 141 extends and/or retracts piston 140 to actuate standardized tool latch 130 within standardized tool latch receiver 230. In certain contemplated embodiments, actuator 141 and tool changer 100 may be a single integrated unit.

Additionally, disconnect housing 131 may be attached to an end of rotary bore 151 and act as a male locking interface for tool 20. Typically, disconnect housing 131 and/or rotary joint bore shaft 153 comprise conduits 111 for wet-matable tool actuator connectors 11,120.

Figure 15:
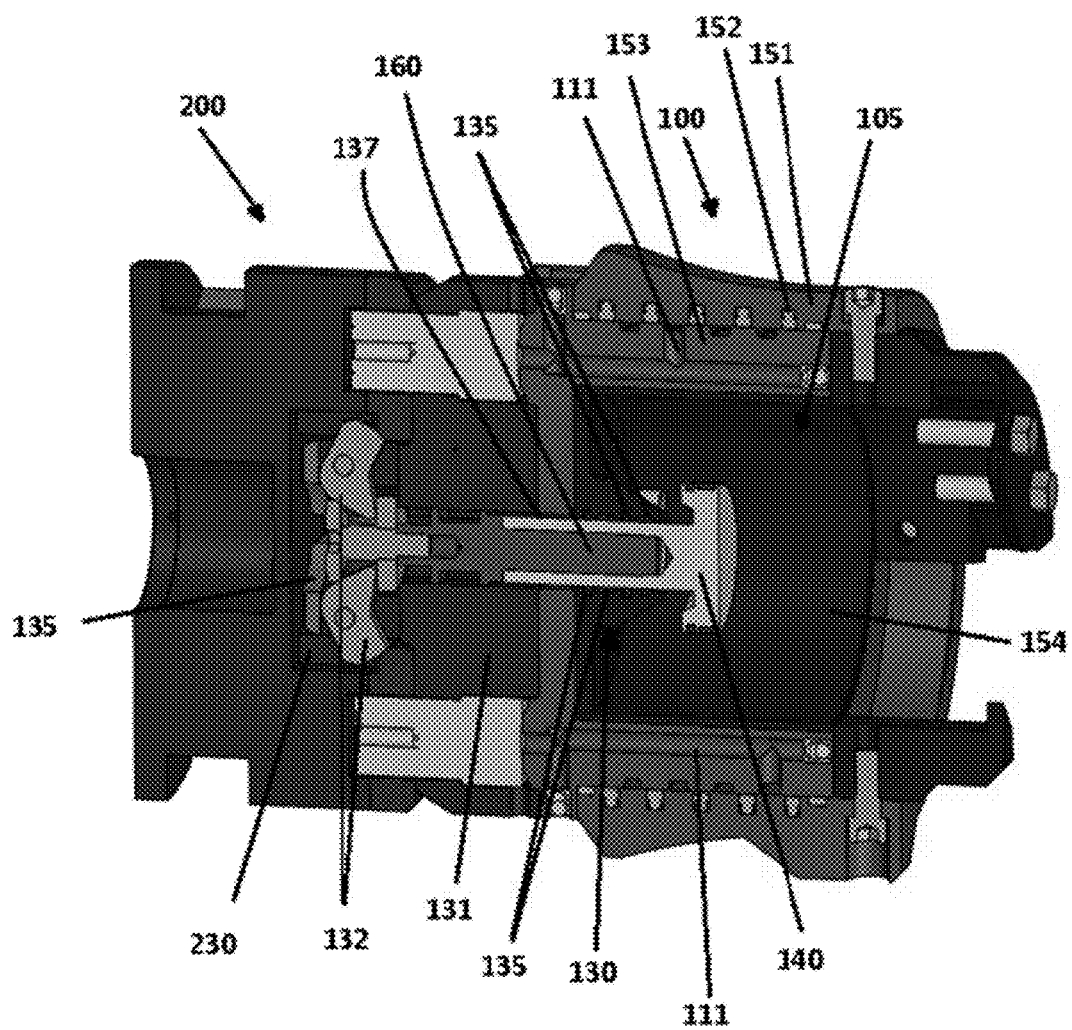
FIG. 15 is a cutaway view in partial perspective of the exemplary ROV attachable standardized tool receiver of FIG. 11.

Referring now to FIG. 15, in a further embodiment, system for changing tools while subsea 2 comprises one or more tool caddies 300, each tool caddy 300 comprising plurality of arms 302 with at least one arm 302 configured to pivot at a predetermined pivot point. Tool caddy 300 may be part of or otherwise attached to a skid (not shown in the figures).

The plurality of arms 302 define tool caddy bay 310. A plurality of tool changer guides 301 are disposed about an inner circumferential surface of tool caddy bay 310, typically where arms 302 may be pivotally mounted and meet at least partially. Remotely operated vehicle (ROV) 400, comprising ROV arm 401, is operatively attached to manipulator tool changer 1, which is as described above. Tool 20,200 is releasably disposed at least partially with tool caddy bay 310 and the plurality of tool insertion guides 112, as described above, are configured to be accepted into the plurality of tool changer guides 301. In most embodiments, tool insertion guides 112 are configured to align ROV attachable standardized tool receiver 16b,100 and tool 20,200 such that each tool insertion guide 112 is aligned with a corresponding tool changer guide 301 and each tapered tool insertion guide 71,112 is at least partially aligned with its corresponding tool insertion guide receiver pair 33,222. When aligned, tool actuator connectors 11,120 and wet-matable tool actuator connector engagers 31,221 pairs are also at least partially aligned as well. Tool insertion guide 71,112 may act as a torque reacting pin to aid in finalizing fine alignment of tool receiver 16b,100 with tool 20 and provide torque reaction.

In the operation of preferred embodiments, an integrated means of changing tools while subsea, which in return allows a multiple range of tooling options without surfacing an ROV, may be provided by aligning tool receiver 16b with tool 20, each as described above, and engaging tool 20 into the tool receiver 16b. Tool 20 may be disposed within tool caddy 300 (FIG. 16) which, as noted above, may be part of an ROV skid or otherwise disposed subsea.

Once engaged, a manipulator wrist-roll function may be used, which may be assisted by an axial spring that provides positive retention, to power interconnection of tool 20 and engage it within tool receiver 16b such as via J-lock channel 41 and its corresponding pin 12 (FIG. 2) or selectively engagable arm 132 received into channel 232.

Once tool 20 is engaged within tool receiver 16b, a tool type identifier for tool 20 may be electronically identified using tool identifier 91 (FIG. 1). This, in turn, may signal software such as located topside to display operating parameters of tool 20 on a topside graphical user interface.

When manipulator tool changer 1 is ready to dock, the wrist-roll may effected to rotate and align alignment aids 19a,19b on clamp collar 18 and collar engager 16a.

Piston 140 may be retracted such as by using actuator 141 to engage locking features such as standardized tool latch 12,130 and their corresponding latch interfaces such as J-lock channel 41 or channel 232. The wrist-roll may also be effected to rotate and orient alignment pin 27 in sight window 17.

Figure 16:
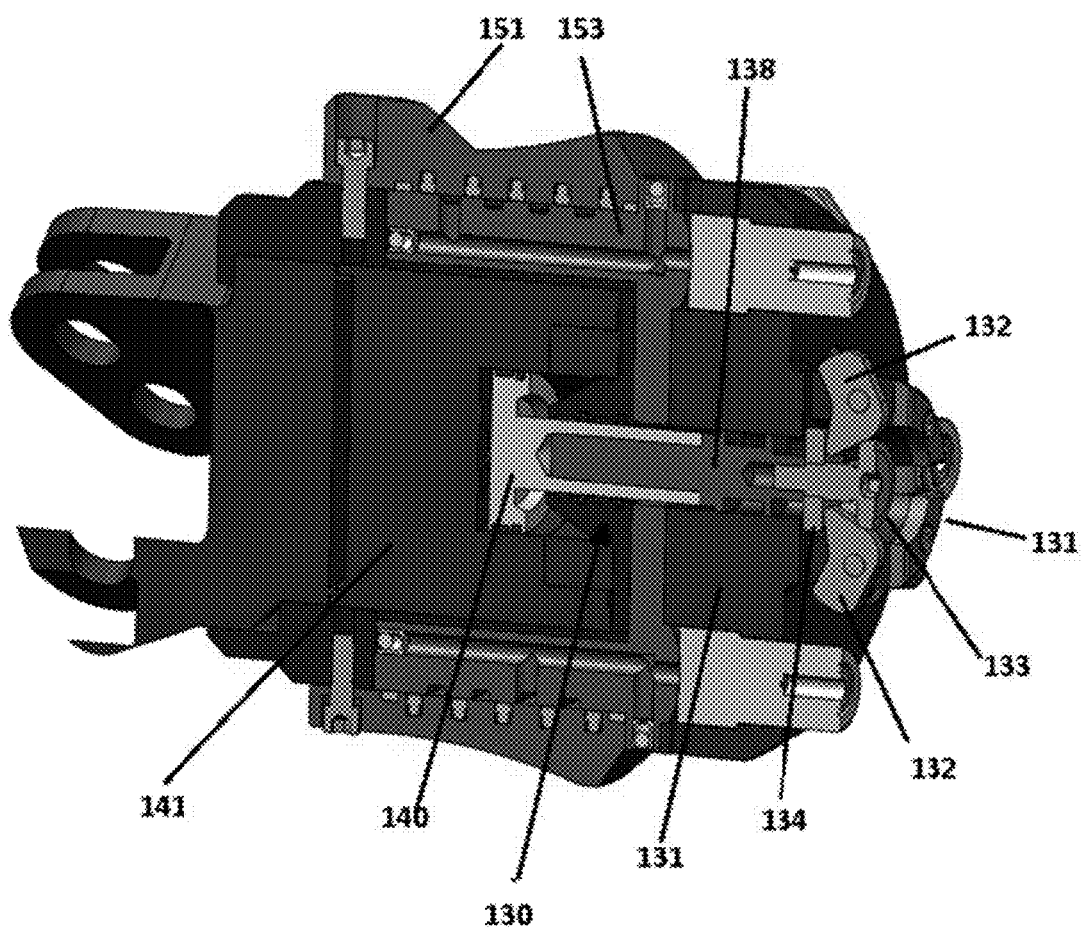
FIG. 16 is a cutaway view in partial perspective of the exemplary ROV attachable standardized tool receiver of FIG. 11.
Figure 17:
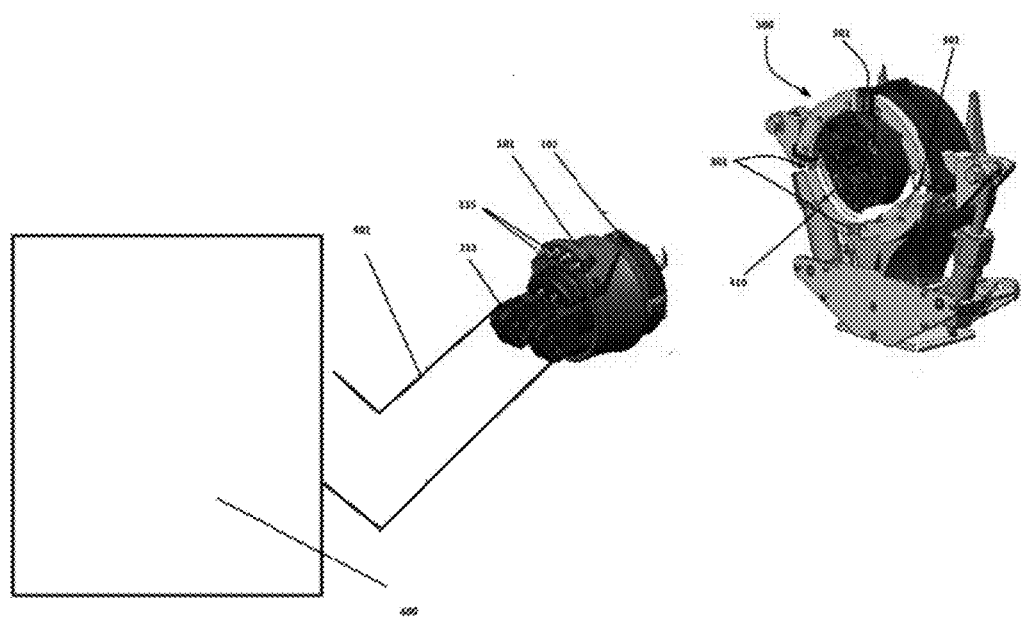
FIG. 17 is partial schematic view of a system incorporating a manipulator tool changer.
Figure 18:
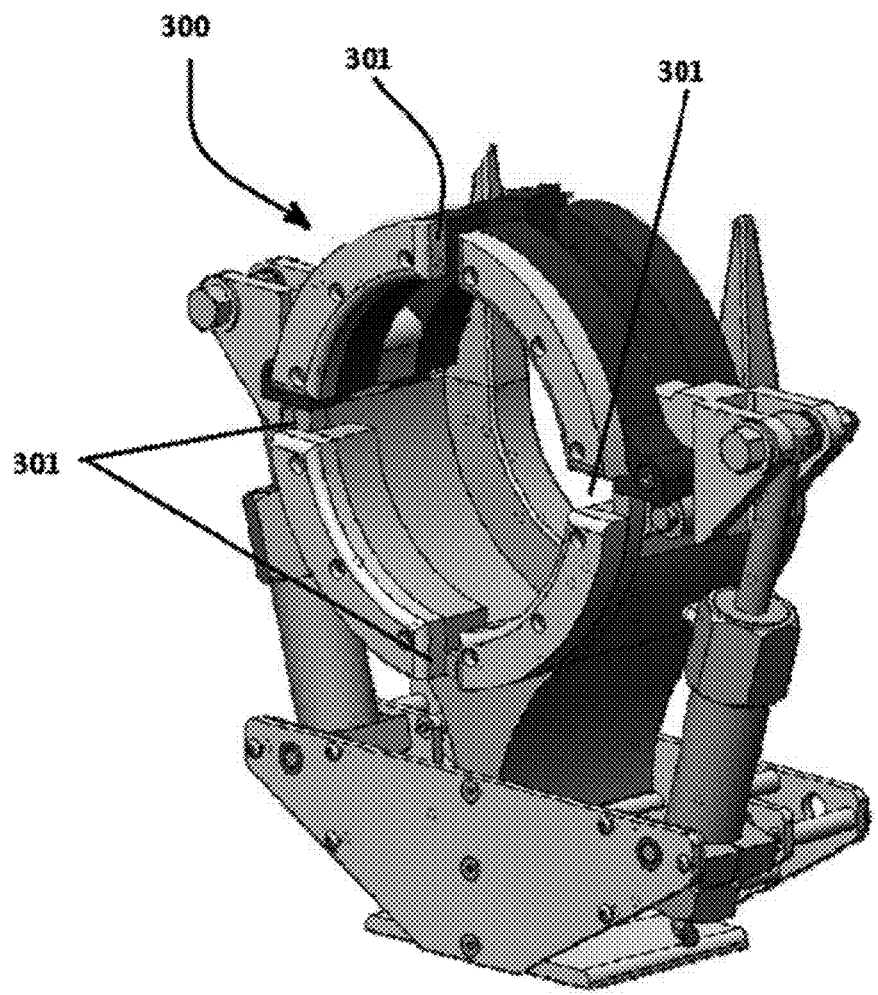
FIG. 18 is a view in partial perspective of an exemplary tool caddy in a closed position.
Figure 19:
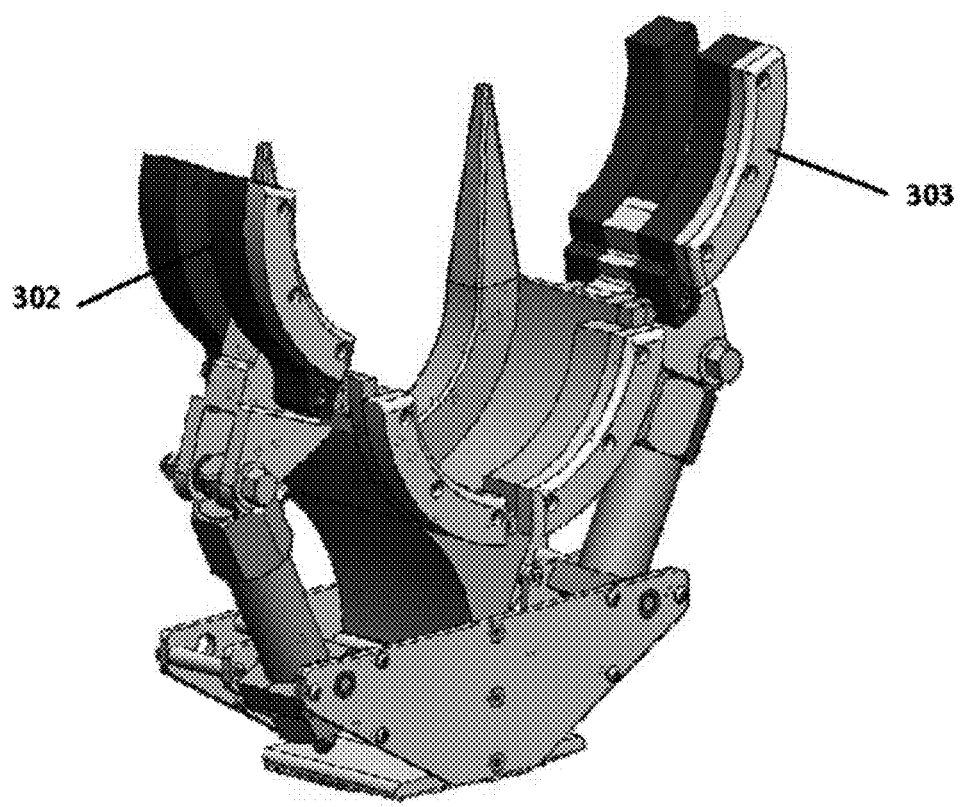
FIG. 19 is a view in partial perspective of an exemplary tool caddy in an open position.
Figure 20:
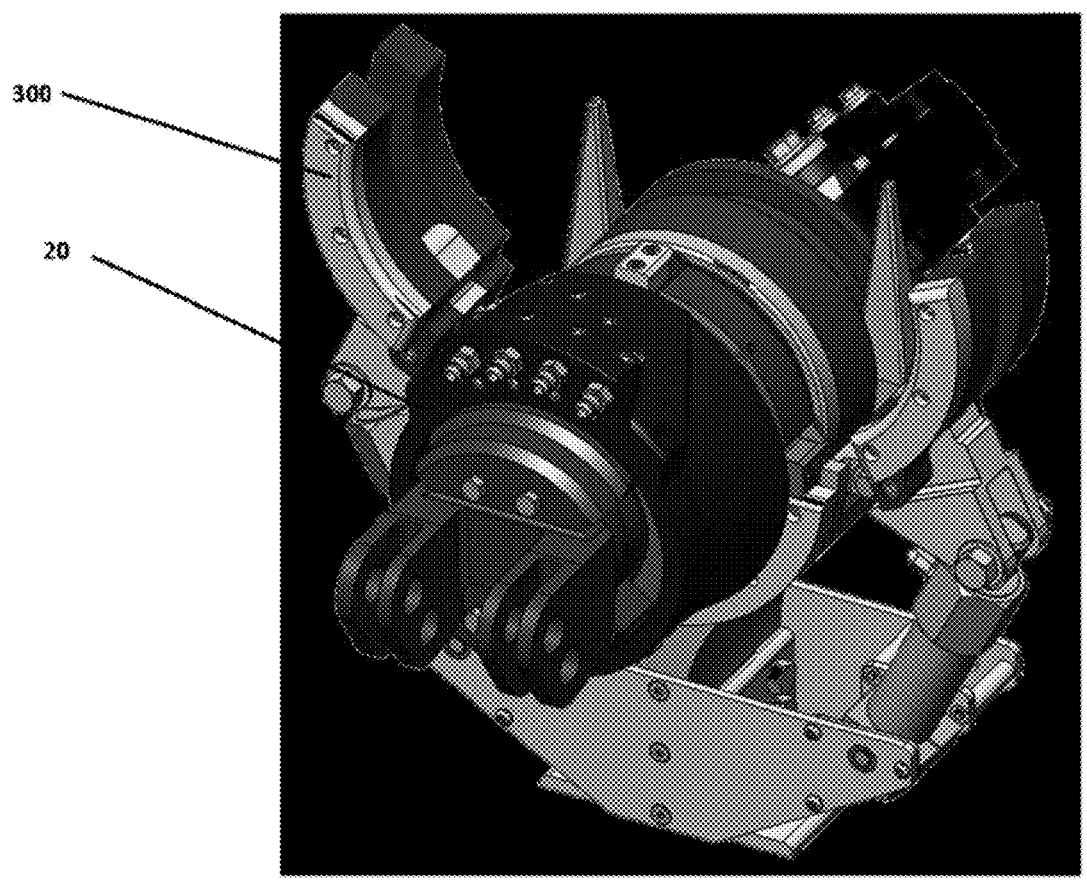
FIG. 20 is a view in partial perspective of an exemplary tool caddy in an open position into which a tool is inserted and attached to an ROV attachable standardized tool receiver.

In a further method, tool 20 may be secured in a compliant tool fixture such as tool caddy 300 (FIG. 16). Manipulator tool changer 1 may be flown to up to tool 20 in tool caddy 300 using ROV 400 and maneuvered to align alignment keys such as tool insertion guides 72,112 with key ways such as tool insertion guide receiver 33,222.

Once aligned, manipulator tool changer 1 may be stabbed until faces 101 and 201 are near flush to flush and tool actuator connectors 11,120 partially engaged, where tool actuator connectors 11,120 are in a ready-to-mate position. Piston 140 may then be retracted to rotate or otherwise extend standardized tool latch 12,130 into their corresponding latch interfaces such as J-lock channel 41 or channel 232 into their locking position and to pull tool 20 into tool changer 10,120, thereby fully mating tool actuator connectors 11,120 and closing the gap between faces 170 and 201. Typically, if present each selectively engagable arm 132 maintains three points of contact that ensures a rigid mate.

In its various embodiments, once operatively mated, fluid and/or signals such as power and/or data signals may be provided to tool 20 via matched and now-operational tool actuator connector 11,120 and wet-matable tool actuator connector engager 31,221 pairs, allowing manipulator tool changer 1 to be capable of operating. These now-operational tool actuator connector 11,120 and wet-matable tool actuator connector engager 31,221 pairs can be used to provide fluid power such as sea water, water based fluids, and hydraulic oils. Manipulator tool changer 1 may also provide up to 120 v of power as well as serial, optical, and/or Ethernet communications paths.

For embodiments using tool caddy 300, to prepare for docking a wrist-roll function is engaged to rotate and align an alignment key such as insertion guide 72, 112 to the top of rotary bore 151. Piston 140 is extended, thus retracting selectively engagable arms 132, to allow for insertion. In these embodiments tool 20 is held in a compliant tool fixture such as tool caddy 300. ROV 400 with its manipulator 401 is flown up to tool 20 and manipulator 401 maneuvered to align the alignment keys such as insertion guide 72, 112 with key ways such as tool insertion guide receivers 33,222. Manipulator 401 is then operated to stab slightly until faces 170,201 are near flush to flush and wet-matable tool actuator connectors 11,120, which are in a ready-to-mate position, are then engaged.

Piston 140 is retracted to rotate or otherwise extend selectively engagable arms 132 into their locking position and to pull tool 20 into ROV attachable standardized tool receiver 10,100. This fully mates wet-matable tool actuator connectors 11,120 and their corresponding wet-matable tool actuator connector engager 31,221 and closes the gap between faces 170,201. Typically, each selectively engagable arm 132 maintains three points of contact that ensures a rigid mate.

Once fully engaged, tool 20 may be released from tool caddy 300 such as by opening tool caddy 300 to allow extraction of tool 20 from tool caddy 300 by manipulator arm 401. Once engaged and mated and released, tool 20 is now operational.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A subsea manipulator tool changer, comprising:
   a. a remotely operated vehicle (ROV) attachable standardized tool receiver, comprising:
      i. a first arm section comprising:
         1. an inner annulus;
         2. a predetermined set of tool controller pathways disposed at least partially within the first arm section;
         3. a selectively attachable first end;
         4. a tool interface movably disposed within the inner annulus;
         5. an actuator operatively in communication with the tool interface; and
         6. a second end disposed opposite the selectively attachable first end; and
      ii. a second arm section disposed proximate the second end of the first arm section and comprising;
         1. a standardized tool latch operatively in communication with the actuator; and
         2. a first predetermined set of wet-matable tool actuator connectors operatively in communication with the predetermined set of tool controller pathways, the tool actuator connectors configured for use subsea; and
      iii. a tool insertion guide disposed proximate the second end; and
   b. a tool, comprising:
      i. a tool insertion end configured to cooperatively mate with the ROV attachable standardized tool receiver, the tool insertion end comprising:
         1. a standardized tool latch receiver configured to selectively and releasably mate with the standardized tool latch;
         2. a tool insertion guide receiver configured to selectively and releasably receive the tool insertion guide; and
         3. a first predetermined set of wet-matable tool actuator connector engagers configured to cooperatively mate with a predetermined subset of matching wet-matable tool actuator connectors of the first predetermined set of wet-matable tool actuator connectors; and
      ii. an ROV manipulatable tool operatively in communication with a wet-matable tool actuator connector engager of the first predetermined set of wet-matable tool actuator connector engagers.

2. The manipulator tool changer of claim 1, wherein the predetermined set of tool controller pathways comprises a hydraulic fluid pathway, an electrical current pathway, and/or a fiber optic pathway.

3. The manipulator tool changer of claim 1, wherein the tool interface comprises:
   a. a piston; and
   b. a seal disposed about an outer surface of the piston.

4. The manipulator tool changer of claim 1, wherein the tool insertion guide and the tool insertion guide receiver are configured such that when mated the first predetermined set of wet-matable tool actuator connector engagers cooperatively mate with a predetermined matching wet-matable tool actuator connector of the first predetermined set of wet-matable tool actuator connectors.

5. The manipulator tool changer of claim 1, wherein the first predetermined set of wet-matable tool actuator connectors comprise quick disconnect connectors.

6. The manipulator tool changer of claim 5, wherein:
   a. the quick disconnect connectors comprise a hydraulic quick disconnect connector, an electrical quick disconnect connector, or a fiber optic quick disconnect connector; and
   b. the first predetermined set of wet-matable tool actuator connector engagers comprise a complimentary hydraulic quick disconnect connector, an electrical quick disconnect connector, or a fiber optic quick disconnect connector.

7. The manipulator tool changer of claim 1, wherein the ROV manipulatable tool comprises an end effector.

8. The manipulator tool changer of claim 1, wherein:
   a. the ROV attachable standardized tool system comprises a radio frequency identifier interrogator; and
   b. the tool comprises a complimentary radio frequency identifier configured to communicate a tool type identifier to the radio frequency identifier interrogator.

9. The manipulator tool changer of claim 1, wherein the tool interface comprises a piston operatively in communication with the actuator.

10. The manipulator tool changer of claim 1, further comprising:
    a. the standardized tool latch further comprises:
       i. a plurality of pivotal arms configured to selectively engage a predetermined portion of the standardized tool latch receiver when fully inserted into the standardized tool latch receiver; and
       ii. a latch post operatively in communication with the piston and the plurality of pivotable arms; and
    b. the standardized tool latch receiver further comprises a channel configured to receive the selectively engagable arm.

11. The manipulator tool changer of claim 10, wherein:
    a. the tool interface comprises a piston operatively in communication with the actuator; and
    b. the standardized tool latch further comprises:
       i. an arm base operatively in communication with the piston and the plurality of pivotal arms; and
       ii. an arm travel limiter operatively in communication with the piston and the plurality of pivotal arms.

12. The manipulator tool changer of claim 11, wherein the arm base further comprises a floating washer configured to maintain contact at all times with each selectively engagable arm.

13. The manipulator tool changer of claim 11, wherein the second arm section further comprises:
    a. a rotary bore;
    b. a rotary joint bore shaft disposed within the rotary bore;
    c. a seal disposed intermediate the rotary joint bore shaft and the rotary bore;
    d. a sleeve bearing disposed within the rotary joint bore shaft; and
    e. a motor operatively in communication with piston and disposed at least partially within the sleeve bearing.

* * * * *